United States Patent [19]

Koros

[11] Patent Number: 5,599,380

[45] Date of Patent: Feb. 4, 1997

[54] POLYMERIC MEMBRANE

[75] Inventor: William J. Koros, Austin, Tex.

[73] Assignee: L'Air Liquide, S.A., Paris, France

[21] Appl. No.: 573,657

[22] Filed: Dec. 18, 1995

Related U.S. Application Data

[63] Continuation of Ser. No. 247,125, May 20, 1994, abandoned.

[51] Int. Cl.$^6$ .................................................. B01D 53/22
[52] U.S. Cl. ........................................................ 95/54; 96/4
[58] Field of Search ........................... 95/54; 96/4, 10–14

[56] References Cited

U.S. PATENT DOCUMENTS

| | | | |
|---|---|---|---|
| 2,947,687 | 8/1960 | Lee | 210/23 |
| 2,953,502 | 9/1960 | Binning et al. | 202/42 |
| 2,960,462 | 11/1960 | Lee et al. | 208/308 |
| 2,966,235 | 12/1960 | Kammermeyer | 183/115 |
| 2,970,106 | 1/1961 | Binning et al. | 208/347 |
| 3,172,741 | 3/1965 | Jolley | 55/16 |
| 3,508,994 | 4/1970 | Nyrop | 156/280 |
| 3,616,607 | 11/1971 | Klass et al. | 55/16 |
| 3,648,845 | 3/1972 | Riley | 210/490 |
| 3,657,113 | 4/1972 | Stancell et al. | 210/23 |
| 3,851,025 | 11/1974 | Ram | 264/41 |
| 4,080,743 | 3/1978 | Manos | 34/9 |
| 4,080,744 | 3/1978 | Manos | 34/9 |
| 4,086,310 | 4/1978 | Bottenbruch et al. | 264/41 |
| 4,113,628 | 9/1978 | Alegranti | 210/500 |
| 4,120,098 | 10/1978 | Manos | 55/16 X |
| 4,132,824 | 1/1979 | Kimura et al. | 428/220 |
| 4,155,793 | 5/1979 | Salemme et al. | 156/246 |
| 4,156,597 | 5/1979 | Browall | 55/16 |
| 4,192,842 | 3/1980 | Kimura et al. | 264/298 |
| 4,260,652 | 4/1981 | Taketani et al. | 427/245 |
| 4,370,290 | 1/1983 | Makino et al. | 264/184 |
| 4,378,324 | 3/1983 | Makino et al. | 264/41 |
| 4,440,643 | 4/1984 | Makino et al. | 210/500.2 |
| 4,460,526 | 7/1984 | Makino et al. | 264/41 |
| 4,474,662 | 10/1984 | Makino et al. | 210/500.2 |
| 4,474,858 | 10/1984 | Makino et al. | 428/473.5 |
| 4,485,056 | 11/1984 | Makino et al. | 264/41 |
| 4,512,893 | 4/1985 | Makino et al. | 210/500.2 |
| 4,528,004 | 7/1985 | Makino et al. | 55/158 |
| 4,602,922 | 7/1986 | Cabasso et al. | 55/158 |
| 4,664,669 | 5/1987 | Ohyabu et al. | 623/66 |
| 4,664,681 | 5/1987 | Anazawa et al. | 96/10 |
| 4,685,940 | 8/1987 | Soffer et al. | 55/158 |
| 4,689,267 | 8/1987 | Takamizawa et al. | 428/376 |
| 4,713,292 | 12/1987 | Takemura et al. | 428/373 |
| 4,714,481 | 12/1987 | Matsuura et al. | 55/158 |
| 4,717,394 | 1/1988 | Hayes | 55/16 |
| 4,741,829 | 5/1988 | Takemura et al. | 210/500.23 |
| 4,756,932 | 7/1988 | Puri | 427/175 |
| 4,818,254 | 4/1989 | Anand et al. | 96/4 X |
| 4,826,599 | 5/1989 | Bikson et al. | 210/500.3 |
| 4,859,215 | 8/1989 | Langsam et al. | 96/4 X |
| 4,863,496 | 9/1989 | Ekiner et al. | 55/158 |

(List continued on next page.)

FOREIGN PATENT DOCUMENTS

| | | |
|---|---|---|
| 0219878 | 4/1987 | European Pat. Off. . |
| 1-099616 | 4/1989 | Japan . |
| 99616 | 4/1989 | Japan . |
| 171619 | 7/1989 | Japan . |
| 1-171619 | 7/1989 | Japan . |

OTHER PUBLICATIONS

J. M. Espenan et al., "Outer Skinned Hollow–Fibers–Spinning and Properties", *Membranes & Membrane Processes*, edited by E. Dimoli et al., 151–161, 1984.

P. Aptel et al., "Polysulfone Hollow Fibers–Effect of Spinning Conditions on Ultrafiltration Properites", *J. Membr. Sci.*, 22, 199–215, 1985.

B. C. East et al., "Production of Porous Hollow Polysulphone Fibres for Gas Seperation", Dept. of Textile Industries, the Univ. of Leeds, 130–157, Sep. 1986.

I. Cabasso et al., "Research and Development of NS–1 and Related Polysulfone Hollow Fibers for Reverse Osmosis Desalination of Seawater", Gulf South Research Institute, 1–145, Jul. 1975.

R. T. Chern et al., "Reversible Isopentane–Induced Depression of Carbon Dioxide Permeation through Polycarbonate", *J. Poly. Sci; Poly Phys Ed.*, 21, 753–763, 1983.

J. M. Mohr et al., "Surface Fluorination of Composite Membranes. Part 1. Transport Properties", *J. Membr. Sci.*, 55, 131–148, 1991.

L. M. Robeson, "Correlation of Separation Factor Versus Permeability for Polymeric Membranes", *J. Membr. Sci.*, 62, 165–185, 1991.

J. M. S. Henis et al., "A Novel Approach to Gas Separations Using Composite Hollow Fiber Membranes", *Separation Science and Technology*, 15(4), 1059–1068, 1980.

W. J. Koros et al., "Membrane–Based Gas Separation", *J. Membr. Sci.*, 83, 1–80, 1993.

J. M. S. Henis et al., "The Developing Technology of Gas Separating Membranes", *Science*, 220, 11–17, Apr. 1983.

C. E. Rogers et al., "Permeability Values—Permeability of Gases and Vapors Through Composite Membranes", *Industrial and Engineering Chemistry*, 49, No. 11, 1933–1936, Nov. 1957.

S. Asakawa et al., "Composite Membrane of Poly(1–(trimethylsilyl)–propyne) as a Potential Oxygen Separation Membrane", *Gas Separation & Purification*, 3, 117–122, Sep. 1989.

M. M. Alger et al., "Gas Transport in Multilayer Packaging Structures", *Polymer Engineering and Science*, 29, No. 10, 639–644, May 1989.

W. Gudernatsch et al., "Influence of Composite Membrane Structure on Pervaporation", *J. Membr. Sci.*, 61, 19–30, 1991.

K. Kimmerle et al., "Analysis of Gas Permeation Through Composite Membranes", *J. Membr. Sci.*, 61, 1–17, 1991.

*Primary Examiner*—Robert Spitzer
*Attorney, Agent, or Firm*—Robert D. Touslee

[57] ABSTRACT

Polymeric gas separation membranes having a separating layer with a high entropic effect are disclosed. Such membranes may provide enhanced gas separation properties for polymeric membranes. A process for making improved gas separation membranes is also disclosed.

9 Claims, No Drawings

U.S. PATENT DOCUMENTS

| | | | |
|---|---|---|---|
| 4,881,954 | 11/1989 | Bikson et al. | 96/10 X |
| 4,885,092 | 12/1989 | Zwick | 210/500 |
| 4,983,191 | 1/1991 | Ekiner et al. | 55/158 |
| 5,073,175 | 12/1991 | Anand et al. | 96/12 X |
| 5,085,676 | 2/1992 | Ekiner et al. | 55/158 |
| 5,085,774 | 2/1992 | Ekiner et al. | 210/500.23 |
| 5,141,530 | 8/1992 | Jensvold et al. | 96/10 X |
| 5,152,811 | 10/1992 | Sanders, Jr. et al. | 96/10 X |
| 5,160,353 | 11/1992 | Gochanour | 96/10 |
| 5,229,465 | 7/1993 | Tsuchida et al. | 96/4 X |
| 5,322,549 | 6/1994 | Hayes | 96/4 X |
| 5,356,461 | 10/1994 | Sluma et al. | 96/10 |

POLYMERIC MEMBRANE

This application is a continuation of application Ser. No. 08/247,125, filed May 20, 1994, now abandoned.

FIELD OF THE INVENTION

The present invention relates to polymeric composite or asymmetric gas separation membranes, particularly, polymeric gas separation membranes in which the morphology of the membrane is designed to increase the entropic selectivity effects of the membrane; and a process for the fabrication of such membranes.

BACKGROUND OF THE INVENTION

The separation of one or more gases from a complex multicomponent mixture of gases is necessary in a large number of industries. Such separations currently are undertaken commercially by processes such as cryogenics, pressure swing adsorption and membrane separations. In certain types of gas separations, membrane separations have been found to be economically more viable than other processes.

In a pressure driven gas membrane separation process, one side of the gas separation membrane is contacted with a complex multicomponent gas mixture and certain of the gases of the mixture permeate through the membrane faster than the other gases. Gas separation membranes thereby allow some gases to permeate through them while serving as a barrier to other gases in a relative sense. The relative gas permeation rate through the membrane is a property of the membrane material composition and its morphology. It has been suggested in the prior an that the intrinsic permeability of a polymer membrane is a combination of gas diffusion through the membrane, controlled in pan by the packing and molecular free volume of the material, and gas solubility within the material. Selectivity is determined as the ratio of the permeabilities of two gases being separated by a material.

It has been recognized the separation factor for gas pairs varies inversely with the permeability of the more permeable gas of the specific pair. In an article entitled "Correlation of Separation Factor Versus Permeability for Polymeric Membranes," *Journal of Membrane Science,* 62 (1991) 165–185 Elsevier Science Publishers B. V., Amsterdam, Lloyd M. Robeson reports that an analysis of the literature data for binary gas mixtures of $H_2$, $O_2$, $N_2$, $CH_4$, and $CO_2$ reveals an upper bound relationship for these mixtures. Robeson further reports that these results indicate that the diffusion coefficient governs the separating capabilities of polymers for these gas pairs. As the polymer segmental spacing becomes tighter the permeability decreases due to decreasing diffusion coefficients, but the separation characteristics are enhanced.

It is known that membranes, such as certain carbon fiber membranes or zeolite membranes, may provide gas separation properties which exceed the upper bound described by Robeson. For example, U.S. Pat. No. 4,685,940 teaches carbon membranes for use in separation processes. Carbon membranes have a predetermined pore size and function as molecular sieves. Carbon membranes function well even at elevated temperatures and may provide superior gas permeation properties. However, such membranes may be expensive, difficult to produce, fragile and/or highly sensitive to impurities, such as oils, in the gas mixture to be separated.

A need therefore exists for a polymeric membrane and a process of manufacture of such membrane which avoids the above shortcomings of the prior art membranes. The present invention is directed to improved membranes, particularly hollow-fiber membranes. The invention, although applicable to membranes generally, has particular utility to hollow-fiber asymmetric and composite membranes. The improved membranes are produced by increasing the entropic selectivity effect of the membrane material to provide a membrane morphology that has improved permeation properties.

SUMMARY OF THE INVENTION

The invention provides a gas separation membrane prepared from one or more film-forming polymer solutions. The membrane may be asymmetric or composite. The film-forming polymer is not limited and may be selected from polymers such as polysulfones, polyethersulfones, polyetherimides, polyimides or polyamides.

The improved gas separation membranes are produced by controlled adjustment of the morphology of the membrane. The advantageous properties are achieved by increasing the entropic selectivity effect of the dense separating layer of the membrane to greater than 1.3. The entropic selectivity effect is a function of the difference in the entropic energies of the gas molecules to be separated, and has the effect of reducing the rotational and/or translational freedom of one gas molecule relative to another. This may be achieved, for example, by eliminating one rotational degree of freedom for the larger gas molecule to be separated. This would occur in a slit shaped pore of thickness dimension greater than the tumbling diameter of $O_2$ but less than the length dimension of $N_2$.

In the case of polymer membranes, the desired membrane morphology may be obtained by adjusting the average spacing between the randomly oriented planes of polymers in the membrane. For example, by analogy to the slit shaped pore case noted above, the spacing between the polymer segments may be adjusted such that the spaces are too small to permit all rotational degrees of freedom for the largest gas molecule to be separated, but the spacing does permit all or at least more rotational degrees of freedom for smaller gas molecules. A similar effect can be achieved in cases where the morphology is adjusted to the point where the size of the gas through which selectivity diffusion occurs is able to selectively inhibit the translational degrees of freedom of the smaller of the two penetrants.

A preferred process for making a multicomponent hollow fiber gas separation membrane of the invention comprises the steps of:

a. dissolving first polymer(s) in a suitable solvent to form a core solution;

b. dissolving second polymer(s) in a solvent to form a sheath solution;

c. coextruding the core and sheath solutions through a spinneret having at least one hollow fiber spinning orifice to provide at least one nascent multicomponent hollow fiber membrane;

d. drawing said nascent multicomponent hollow fiber membrane through an air gap;

e. introducing said nascent multicomponent hollow fiber membrane into a coagulation bath to solidify the nascent multicomponent hollow fiber membrane into a hollow fiber membrane; and f. optionally, treating the hollow fiber membrane by pyrolysis, cross-linking, oxidation, halogenation or crystalline cross-linking to provide a membrane with a polymeric separating layer having an entropic effect greater than 1.3.

A corresponding process may also be used to make an asymmetric gas separation membrane.

Surprisingly, the polymeric gas separation membrane may be able to provide gas separation properties which exceed the known upper bound for various gas mixtures. Such membranes may provide gas separation properties which rival or exceed those of carbon fiber membranes or zeolite membranes.

DETAILED DESCRIPTION OF THE INVENTION

Components of the Membrane

The present invention allows for manufacture of improved polymeric membranes, especially multicomponent and asymmetric gas separation membranes. In manufacture of the membranes, a wide range of materials may be used as the gas separating layer. These materials include polyamides, polyimides, polyesters, polycarbonates, copolycarbonate esters, polyethers, polyetherketones, polyetherimides, polyethersulfones, polysulfones, polyvinylidene fluoride, polybenzimidazoles, polybenzoxazoles, polyacrylonitrile, cellulosic derivatives, polyazoaromatics, poly(2,6-dimethylphenylene oxide), polyphenylene oxides, polyureas, polyurethanes, polyhydrazides, polyazomethines, polyacetals, cellulose acetates, cellulose nitrate, ethyl cellulose, styrene-acrylonitrile copolymers, brominated poly(xylylene oxide), sulfonated poly(xylylene oxide), tetrahalogen-substituted polycarbonates, tetrahalogen-substituted polyesters, tetrahalogen-substituted polycarbonate esters, polyquinoxaline, polyamideimides, polyamide esters, polysiloxanes, polyacetylenes, polyphosphazenes, polyethylenes, polyphenylenes, poly(4-methylpentene), poly(trimethylsilylpropyne), poly(trialkylsilylacetylenes), polyureas, polyurethanes, and so-called ladder polymers, blends thereof, copolymers thereof; substituted materials thereof, and the like. It is further anticipated that polymerizable substances, that is, materials which cure to form a polymer, such as vulcanizable siloxanes and the like, may be suitable for making the gas separation membranes of the present invention.

Suitable substrate layer materials for multicomponent membranes of the present invention may include polysulfone, polyethersulfone, polyamide, polyimide, polyetherimide, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyquinoxaline, polyamideimides, polyamide esters, blends thereof, copolymers thereof, substituted materials thereof and the like. This should not be considered limiting because any materials which can be fabricated into an anisotropic substrate membrane may find utility as the substrate layer of the present invention. Preferred materials for the substrate layer include polysulfone, polyethersulfone, polyetherimide, polyimide and polyamide compositions. Especially preferred substrate materials are described in U.S. Pat. No. 5,085,676.

The polymers for an asymmetric membrane and for both the substrate gas separating layer of a multicomponent membrane should have a sufficiently high molecular weight to be film forming.

Gas separation membranes of the present invention may be in the form of various shapes such as flat membranes or hollow-fiber membranes. The membrane is preferably in the form of a hollow fiber due to the surface area advantages available. The flat film membranes may be prepared through coextrusion of the polymer solutions for the separating and support layers to form a nascent multilayer membrane.

The critical feature of the membrane material which has heretofore not been recognized or appreciated by the prior art is the entropic selectivity effect. The entropic selectivity effect refers to an enhancement in mobility selectivity that occurs in addition to the standard selectivity arising from the exponential dependency of mobility selectivity on the difference in actuation energies of the two penetrants, A and B, that are being separated, viz. Mobility Selectivity is proportional to frequency of an "A" jump/frequency of a "B" jump, which is proportional to $$\underset{\text{Energetic Selectivity Effect}}{\underset{\text{(I)}}{\exp[-(\Delta E_A - \Delta E_B)/RT]}} \times \underset{\text{Entropic Selectivity Effect}}{\underset{\text{(II)}}{\exp[(\Delta S_A - \Delta S_B)/R]}}$$

where $\Delta E$ is the activation energy of the molecule determined from the Arrhenius plot of the diffusion versus temperature and $\Delta S$ is the entropy which is also determined by the Arrhenius plot of the diffusion versus temperature. Because A and B are typically very close in size, the respective jump lengths are similar, so the relative frequencies of A to B jumps control the mobility selectivity. The relative frequency of executing a jump is determined by the product of the two exponential functions related to the differences in activation energies (Formula I) and entropies for the jumping process (Formula II). Polymers that lie on or below the upper bound described by Robeson have exponential energy terms (I) that are similar to the rigid carbon membranes or zeolites. This is illustrated by Table 1 in which the "upper bound polymer" that lies on Robeson's line has an "energetic effect" term equal to 4.35 vs. 5.1–7.1 for carbons or zeolites. In the case of the polymer, this term is thought to be due to the need to move segments of polymer. Larger segments of polymer must be moved to accommodate jumps of the larger molecule (e.g. $N_2$) vs the smaller molecule (e.g. $O_2$). If one could have a perfectly sized permanent gap as in a zeolite, no energy is needed to move a segment or subsegment to create a gap. In this case, the only activation energy is due to the need for the penetrant to overcome repulsion of the electron clouds of the atoms surrounding the critical gap. In upper bound polymers, motion may or may not be needed to make a gap to allow movement of the desired penetrant; however, the environment is such that the transport-regulating gap is so large that the difference in the entropic energies, $\Delta S_A - \Delta S_B$, is less than or equal to zero, so term II, the entropic selectivity effect, is less than or equal to unity. For situations in which the gap size is sufficiently larger than the minimum diameter of the smallest penetrant, (e.g., 3.46 Å for $O_2$) but close to or smaller than the minimum diameter of the largest penetrant (e.g., 3.64 Å for $N_2$), the larger penetrant will be robbed of its translational energy by electron repulsion as it approaches the gap. The smaller penetrant will not experience such strong repulsion, because these forces fall off extremely rapidly so the smaller penetrant has a low $\Delta S_A$ while $\Delta S_B$ is negative. In such a case, the energetic selectivity of the polymer may be enhanced by a factor of up to 4.5.

Similar effects occur for slits in the polymer membrane with regard to loss of one degree of rotational freedom or for relatively round circular gaps with regard to loss of both degrees of rotational freedom, if the dimensions are correct to inhibit rotation perpendicular to the long axis of the molecule.

The entropic selectivity effects for mixtures of oxygen and nitrogen at 35° C. are known for a variety of materials. For example, the entropic effects for zeolite is 14.7 and for carbon molecular sieves is 4.9. However, the entropic effects for typical glassy polymers is less than 1.0 and for the "upper bound" polymer described by Robeson is about 1.3.

Fabrication of Inventive Membranes

For the purpose of illustrating the invention, the following discussion exemplifies the formation of multicomponent membranes with two components, that is, a gas separating component and a substrate component. This should not be considered limiting, however, because this method is useful for forming asymmetric membranes. In addition, the multicomponent membranes of the present invention may incorporate more than two component layers. The additional layers may function as gas separating layers, structural layers, compatibilizing layers, substrate layers, layers which reduce environmental concerns, or combinations thereof. These additional layers may contain the materials employed in the gas separating layer and the substrate layer.

The materials of each layer of the multicomponent membrane should be sufficiently compatible to ensure integrity of the composite membrane during processing or when employed in gas separations.

Multicomponent hollow fiber membranes in the form of hollow fibers may be formed by coextrusion of the support polymer and separating polymer solutions. For example, polymer solutions for the layers may be coextruded through a multiple channel spinneret while maintaining a gas pressure or a bore fluid in the nascent hollow fiber bore to maintain the fiber's structural integrity. Such multiple channel spinnerets have been described in the prior art for use in melt extrusion of multicomponent fibers. Coextrusion, and the apparatus and processes therein, of polymers is well known in the art.

During fabrication of the hollow fiber membranes, the separating layer is preferably formed on the outside surface of the fiber to maximize the membrane surface area exposed to the gas. However, the separating layer also may be formed as the inner layer of fiber. The multicomponent hollow fiber membrane of the present invention may have an outside diameter of about 75 to 1,000 microns, preferably 100 to 350 microns, and a wall thickness of about 25 to 300 microns, preferably 25 to 75 microns. Preferably, the diameter of the bore of the fiber is about one-half to three-quarters of the outside diameter of the fiber. The porosity of the resultant membrane is sufficient so that the void volume of the membrane is within the range of 10 to 90 percent, preferably about 30 to 70 percent, based on the volume contained within. As noted above, the entropic effect of the membrane material is greater than 1.0.

The polymers employed in the preparation of the hollow fiber membranes have sufficiently high molecular weight that the resultant spin dope formulations can be extruded through a spinneret to form a self-supporting hollow fiber which can be processed in the subsequent steps of the spinning process. Typical zero-shear viscosities of the spin dopes at 70° C. are in excess of several hundred poise, preferably in the range of 100 to 5000 poise.

As mentioned, the spin dope formulations are extruded through a spinneret to provide hollow fiber membranes. The combination of the volumetric rate of supply (measured in terms of cubic centimeters of dope/unit time) of the spin dope to the spinneret and the rate of fiber take up can be varied to control production rate, fiber size, morphology and draw ratio. Preferably, the volume rate of supply of the dope is 50 to 500 cc/minute, most preferably, 100 to 300 cc/minute.

The spinnerets employed in the process of the invention are maintained during extrusion at a temperature sufficient to attain a viscosity of the spin dope sufficient to facilitate draw down of the nascent fiber. Generally, the spinneret may be maintained at 40° to 130° C., preferably 60° to 100° C.

During extrusion of one polymer solution through a hollow fiber spinneret, a bore fluid is injected within the bore of the fiber to facilitate generation of the hollow fiber configuration. The bore fluid can be a mixture of a solvent and a nonsolvent for the polymer to provide a slow rate of coagulation and to permit draw down of the fiber, or it can be an inert gas such as $N_2$. Suitable bore fluids include, but are not limited to, water, N-methylpyrollidone (NMP), dimethyl formamide (DMF), and dimethyacetamide (DMAc). Preferably, the bore fluids include mixtures of solvents such as DMAc, NMP, DMF, and the like with water.

At the exit of the spinneret, the nascent fiber is briefly exposed to an air gap of a gaseous atmosphere immediately prior to contacting a fluid coagulation bath. The choice of pressure, temperature, composition of the atmosphere, as well as the time period of exposure of the fiber to the gaseous atmosphere are chosen to control the morphology of the nascent fiber.

Typically, the nascent fiber travels through the air-gap at room temperature. The temperature of the air gap medium can be varied to facilitate evaporation of the solvent from the nascent fiber. Generally, the air gap may be at ambient, as well as elevated temperatures. Preferably, the air gap temperature is at ambient temperature.

The composition of the gaseous atmosphere of the air-gap is generally chosen to facilitate evaporation of the solvent from the fiber. Possible gas compositions include, but are not limited to air, nitrogen, inert gases such as He, Ar, Xe and the like. Alternatively, pressures below atmospheric may be employed in the air gap. Preferably, air and inert gases can be employed in the air gap. Most preferably, air is employed in the air gap.

After contacting the gaseous atmosphere of the air gap, the fibers are passed into a coagulation bath to coagulate the fiber by extraction of the solvent prior to being wound onto a takeup roll. The choice of bath composition and temperature is made to control the rate of coagulation and morphology of the fiber. Possible compositions of the coagulation bath that may be employed in the invention include, but are not limited to water, aliphatic alcohols, mixtures of aliphatic alcohols, and mixtures of aliphatic alcohols with water. Other possible compositions for the coagulation bath include aqueous solutions of DMF, NMP, and DMAc. Preferably, the composition of the coagulation bath is a mixture of aliphatic alcohols and water. Most preferably, the bath composition is water. The temperature of the coagulation bath can be varied to control the rate of coagulation and fiber morphology. Generally, the bath is maintained at a temperature of less than 25° C., preferably 0° to 20° C., most preferably 5°–15° C. Suitable coagulation bath compositions for the nascent membranes vary depending on the composition of the polymer solutions employed and the results desired. Generally, the coagulation bath medium is miscible with the solvent or the solvent mixture of the spin dope, but is a non-solvent for the polymers. However, the coagulation bath may be varied to achieve desired properties in the individual layers of a composite membrane. For example, for a multicomponent membrane, the solvent of the separating layer polymer solution may be less miscible in the coagulation bath than the solvent of the substrate layer polymer solution allowing different rates of solvent extraction. A coagulation bath, therefore, may be a multicomponent mixture of water and an organic solvent that is miscible with water and the solvent to be removed from the polymer. The temperature and composition of the bath also may be controlled to affect the extent and rate of coagulation. After treatment of the fiber in the coagulation bath, the fibers are wound onto a takeup roll or other suitable collection device.

The ratio of the drawing speed of the fiber to the extrusion velocity of the fiber may be varied over wide limits. Generally, the rate of extrusion velocity of the fiber may vary from 2 to 100 meters/minute, preferably 3 to 50 meters/minute, most preferably 5 to 20 meters/minute. Similarly, the rate of drawing of the fiber may vary from 5 to 500 meters/minute, most preferably 50 to 150 meters/minute.

The nascent membrane is optionally dried under specified conditions and then precipitated in a coagulating bath that is a non-solvent for the polymer, but is a solvent of the polymer solvent. The nascent film can be optionally dried at from 10° C. to 200° C., preferably 25° C. to 100° C., for 0.01 to 10 minutes, preferably for 0.05 to 1.0 minutes, by passing the nascent film through an oven. The nascent film is then precipitated in the coagulating bath.

The resulting fiber membranes are washed to remove residual solvent and the like, whereafter they are dried. Typically, washing is accomplished by placing the fiber membranes into water at 25° C. to 100° C., preferably 25° C. to 75° C. for a period sufficient to remove substantially all residual solvent as well as other impurities such as residual additives in the spin dope. Thereafter, the fibers are air dried or dehydrated by solvent exchange. For example, the polyaramide fibers may be dehydrated by a two step solvent exchange by first using methanol and then FREON® F-113. Such methods of solvent exchange, are known in the art, as described in U.S. Pat. Nos. 4,080,743; 4,080,744; and 4,120,098. Alternatively, the fibers may be dehydrated by heating in atmosphere; such as air, and the like.

Typical solvents for the polymer solutions included solvents such as dimethyl formamide, N,N-dimethylacetamide, N-methylpyrrolidone, dimethyl sulfoxide and the like. These solvents are useful with the preferred polymer materials of the present invention, that is polysulfone, polyethersulfone, polyamide, polyimide and polyetherimide. These solvents, however, are merely illustrative and should not be considered limiting.

Mixtures of solvents also may be used in the polymer solutions employed to form the layers of the membrane. For example, two or more solvents may be used which vary in volatility or solvation power.

The solvent mixture also may contain additional components such as polymer swelling agents, and nonsolvent components. These added components may be useful, for example, to achieve a desired anisotropy in the morphology of the dense separating layer of the membrane by moving the polymer solution closer to its point of incipient gelation. These additional components may be characterized as extractable or nonextractable in the coagulation bath. Extractable components, that is, materials which are extractable in an aqueous-based coagulation bath, may be useful, for example, as pore formers in a layer. Examples of extractable components include inorganic salts, and polymers such as polyvinyl pyrrolidone. Examples of additional components which may be employed include, for example, discrete monomeric materials which are insoluble in the composition of the coagulation bath, polymerizable materials such as moisture-curable siloxanes, and compatible or non-compatible polymers. The foregoing examples of additional components are merely illustrative and should not be considered limiting. The fabrication processes employed to form the multicomponent membranes of the present invention generally depend on the major component of the membrane. For example, in manufacture of bicomponent hollow fiber membranes, selection of the spinning parameters depends on the spinability of the substrate layer solution. This means that bicomponent membranes formed by the present invention readily can be spun essentially under the same conditions as the underlying substrate layer.

The polymer membrane may be treated at various steps during the process so as to provide a membrane material with an entropic selectivity effect greater than 1.3. Preferably, the dried membrane is treated to achieve the desired entropic selectivity effect. For example, the separating layer of the multicomponent polymeric membrane may be pyrolyzed, cross-linked, oxidized, halogenated and/or crystalline cross-linked by methods well known in the art. These steps are not intended to be limiting, as long as the finished membrane has a polymeric separating layer with an entropic selectivity effect greater than 1.3. The pyrolysis, for example, can be generally effected in a wide range of temperatures, between the decomposition temperature of the carbonaceous material and the graphitization temperature (about 3000° C.). Generally, pyrolysis will be effected in the range of from 250° C. to 2500° C., a preferred range being about 450° C. to about 800° C.

During the pyrolysis process, the heating is preferably effected under an inert atmosphere such as nitrogen or noble gas which aids in controlling oxidation. Controlled oxidation results in a pore opening, and thus predetermined pore-size ranges can be obtained, suitable for the intended separation process. Suitable oxidizing agents include oxygen, steam, carbon dioxide, nitrogen oxides and chlorine oxides, solutions of nitric acid, sulfuric acid, chromic acid and peroxide solutions. After oxidation treatment the membrane should be degassed at elevated temperatures.

The objective of this treatment is to adjust the morphology of the polymer chain so as to provide an aperture which restricts at least one rotational and/or transitional degree of freedom in one or more of the gas molecules to be separated.

The movement of polymer segments and subsegments can be visualized as a rapidly flickering picture. Exchanges between subtly different segmental and pendent group conformations occur over a characteristic time scale moderated by, among other things, the intrinsic rigidity of the polymer backbone and steric resistances to movement of pendant groups.

It is known that a so-called rocking motion around a mobile "hinge" in the polymer chain may produce a penetrant-scale gap to allow movement of a sorbed gas molecule. Structural variations that increase the average distance between the nested backbones of the polymer produce a more open polymer matrix. In the more open matrix, larger intersegmental apertures will presumably preexist in the local "sorbed cage" surrounding a penetrant between diffusional jumps. These larger average apertures can be transiently opened with a smaller amplitude rocking motion of the surrounding segments than in the less open matrix. Clearly, therefore, the average jumping frequency of both large and small penetrants will tend to increase in the more open matrix. By suppressing angular displacements of the surrounding segments of the polymer chain and pendant groups via motional inhibitions, mobility selectivity can be maintained or increased even for molecules with small differences in size. It has now been discovered that "mobile" hinges in and attached to the polymer chain and the resulting aperture may be adjusted so as to alter the translational and rotational degrees of freedom of one or more of the gas molecules to be separated to an extent not achieved by materials that exist on or below the "upper bound" line of Robeson.

It is believed that one manifestation of this concept would be polymers having benzene rings in the backbone of the polymer chain such that any polymer hinges in between one or more benzene rings are, at least 15 Angstroms apart and preferably 15–20 Angstroms apart, so as to provide a membrane separating layer with an increased entropic selectivity effect. In such a case, these polymer chains resemble planar polymer ribbons. Such polymeric membranes may provide selectivity greater than 8.0, preferably greater than 10.0 for $O_2/N_2$ systems. The selectivity of such membranes is controlled by the entropic selectivity effects, rather than the relative energetic resistance to executing diffusional jumps as characterized by the negative exponential of the energy divided by the product of the universal gas constant, R, and absolute temperature. The potential relative importance of these two effects is clear from consideration of Table 1 in which the highly open matrix polymer and the zeolite and molecular sieve carbons all have activation energy differences of −0.9–1.2 kcal/mol while only the rigid zeolite and carbon molecular sieve matrices provide entropic selectivity effects significantly greater than 1.0.

With reference to a mixture of oxygen and nitrogen, it is believed that the entropic effects may be explained on a molecular scale. An oxygen molecule has a length of 3.73 Angstroms and minimum width of 3.46 Angstroms. The nitrogen molecule has a length of 4.03 Angstroms and minimum width or 3.64 Angstroms. The nitrogen molecule is, therefore, more elongated. The molecules are spinning rapidly in their respective cages. The minimum cross-sectional dimensions of the gas molecule will, in the first instance, determine their relative ability to permeate through the polymeric material. However, adjusting the size and configuration of the apertures in the membrane to reduce the rotational freedom of the nitrogen molecule will significantly inhibit the ability of nitrogen to permeate through the membrane. Similar principles apply to the translational degrees of freedom since an aperture that is near the size of $N_2$ will exceed the size of $O_2$ and not provide nearly the magnitude of repulsive restriction for the $O_2$ molecule's ability to penetrate through the orifice.

Improved Properties

A surprising advantage which may be provided by the present invention is its ability to produce polymeric membranes having improved gas separation properties. It is believed that the advantageous properties of the present gas separation membranes are derived from the reduction in the rotational and/or translational freedom of the largest gas molecule in the gas mixture being treated.

In the prior art, others have sought to increase the gas separation properties of membranes by manipulating the diffusion coefficients of the gases by increasing or decreasing the relative energy effects of the polymer material relative to the gases to be separated by controlling the energy needed to move a polymer segment or subsegment to create a transient gap without reference to the special need to tailor the available gaps in such a way to impose selective restriction of the degrees of translational and/or rotational freedom of one of the penetrants which is to be primarily rejected from passage.

Robeson's article entitled "Correlation of Separation Factor Versus Permeability for Polymeric Membranes," *Journal of Membrane Science,* 62 (1991) 165–185 Elsevier Science Publishers B. V., Amsterdam, is exemplary of prior efforts to improve the gas separation properties of polymeric membranes. Robeson reports the relevance of the diffusion coefficient and the solubility constant in his article, as follows:

"The basic permeability equation (for non-concentration dependant Fickian diffusion) is

P=DS where P is the permeability coefficient, D is the diffusion coefficient, S is the solubility constant. The diffusion coefficient of common gases in polymers was recognized early as a strong function of the effective molecular diameter of the gas molecule and various correlations existing in the literature will be noted. The solubility constant for the common gases generally follows Henry's law behavior. . . ."

"The solubility constant of gases in a specific polymer was shown to be related to the boiling point and the critical point of gases by van Amerongen [26]. . . . .

"As will be shown in this paper, an upper bound appears to exist for $\alpha_{ij}$ ($P_i/P_j$) [selectivity] versus $P_i$ (i=fast gas) [permeability]. The role of the solubility separation ($S_i/S_j$) appears to be of minimal significance relative to this observation, and the primary factor is due to the diffusion separation ($D_i/D_j$) value in the following expression:

$$\alpha_{ij} = \frac{P_i}{P_j} = \left(\frac{D_i}{D_j}\right)\left(\frac{S_i}{S_j}\right) \ldots$$

"It has been well recognized that the diffusion coefficient is the primary factor in determining the absolute value of gas permeability in polymers. The diffusivity of gases (in elastomers) was shown by van Amerongen [26] to decrease rapidly as the collision diameter of the gas molecule (determined from gas viscosity data) increases. In comparison of various elastomers, a proportionality (although not ideally linear) was shown to exist for the plot of log D versus the gas molecule diameter."

Robeson focuses strictly on the energy effects of the gases permeating through the polymer. He proceeds to disclose permeability properties for a variety of polymers and a variety of gas mixtures.

The prior art does, however, not teach a membrane which possesses a high entropic selectivity effect, to provide a further threshold for obtaining improved selectivity versus permeability. In particular, prior art focuses on controlling the diffusion coefficient of gas A relative to gas B by regulating the energetic effects relative to opening a transient gas that will allow movement of the molecule with the smallest minimum dimension without cognizance that rotational ability is a hindered environment such as a polymer is also critically dependent upon the length (longest dimension) of the molecule of the gases relative to the polymeric material. Traditionally, it has been thought that regulation of the mobility selectivity requires consideration strictly of the minimum dimensions ("sieving diameter") of the two gas molecules to be separated. These dimensions determine the relative abilities of penetrants to execute diffusive jumps through the spectrum of transiently opening size selective intersegmental gaps in the polymeric matrix.

For penetrants of similar size, (e.g., $O_2$ vs. $N_2$) the jump length term is generally thought to be similar, so for example, mobility selectivity should be determined by the jumping frequency of $O_2$ relative to $N_2$ in the matrix. Oxygen has a diameter of 3.46 Å, thereby yielding the 0.18 Å size difference from nitrogen.

For example, highly rigid glassy materials may have mobility selectivity up to 8.5 for the $O_2/N_2$ system. The relative difficulty in controlling mobility selectivity in such traditional materials, and even in the "upper bound" materials discussed by Robeson, can be understood by applying the zeolite sieving diameter concept for the several penetrants of interest.

Solubility effects, while not dominant, can still be important. In general, therefore, although moderated by the solubility selectivity, mobility selectivity dominates the permselectivity behavior in membranes for supercritical gas separations.

The membranes of the present invention possess a high entropic selectivity effect and therefore posses superior gas separation properties.

Utility of the Inventive Membranes

The novel membranes of the invention have use in a wide variety of gas separations. For example, the membranes of the present invention are useful for the separation of oxygen from air to provide enriched oxygen to provide enhanced combustion, and for the separation of nitrogen from air to provide inerting systems; in recovery of hydrogen from hydrocarbon gas in refinery and ammonia plants; separation of carbon monoxide from hydrogen in syngas systems; for separation of nitrogen from ammonia; and separation of carbon dioxide or hydrogen sulfide from hydrocarbons.

The novel multicomponent membranes of the present invention, however, are not limited to use in gas separations. Generally, all known membrane separations can benefit from utilizing the novel membranes described herein. For example, the membranes may find use in reverse osmosis, microfiltration, ultra-filtration or other separations such as bioseparations that require affinity of certain components in a complex mixture with the membrane to effect efficient separations.

TABLE 1

| Material | Oxygen/Nitrogen Selectivity at 35° C. | $\Delta E_{O_2}$ (kcal/mol) | $\Delta[\Delta E_{O_2,N_2}]$ (kcal/mol) | Energetic Selectivity Effect $\exp[-\Delta[\Delta E_{O_2,N_2}]/RT]$ | Entropic Selectivity Effect $\exp[\Delta[\Delta S_{O_2,N_2}]/R]$ |
|---|---|---|---|---|---|
| 4A Zeolite | 102 | 4.5 | −1.2 | 7.1 | 14.7 |
| Carbon Molecular Sieves | 25–45 | 5.5 | −1.0 | 5.1 | 4.9–8.8 |
| "Upper Bound" Polymer | 4.8–5.1 | 5.3 | −0.90 | 4.35 | 1.1–1.2 |

What is claimed is:

1. A process for separation of a first gas from a second gas which comprises providing a gas separation membrane comprised of a polymeric separating layer with a selectivity effect greater than 1.3, wherein the first and second gases are contacted with an aperture within said polymeric separating layer which restricts at least one rotational and/or transitional degree of freedom in the second gas relative to the first gas so as to form a permeate gas rich in the first gas and a residue gas rich in the second gas.

2. The process of claim 1, wherein the first and second gases are oxygen and nitrogen.

3. The process of claim 1, wherein the polymeric separating layer has selectivity of greater than 8.0 for oxygen/nitrogen systems.

4. The process of claim 3, wherein the gas selectivity is greater than 10.0 for oxygen/nitrogen systems.

5. A gas separation membrane having a morphology comprising a polymeric separating layer with the membrane morphology being such as to have an entropic selectivity effect greater than 1.3.

6. The membrane of claim 5 wherein the entropic selectivity effect is greater than 1.5.

7. The membrane of claim 5 wherein the entropic selectivity effect is greater than 2.0.

8. The membrane of claim 5 having an oxygen/nitrogen selectivity which is greater than 8.0 at room temperature.

9. The membrane of claim 5 wherein the polymeric separating layer comprises a polymer having a polymer chain including a backbone, wherein aromatic rings are in the backbone of said polymer chain, and said polymer has hinges in between at least two aromatic rings and at least 15 Angstroms apart.

* * * * *